No. 12,838. REISSUED AUG. 4, 1908.

A. J. LECOUTRE.

CORSET.

APPLICATION FILED APR. 30, 1908.

Witnesses

R. D. Tolman

M. Haas

Inventor

A. J. Lecoutre

By John C. Dewey

Attorney.

UNITED STATES PATENT OFFICE.

AUGUSTE JEAN LECOUTRE, OF WORCESTER, MASSACHUSETTS, ASSIGNOR TO ROYAL WORCESTER CORSET COMPANY, A CORPORATION OF MASSACHUSETTS.

CORSET.

No. 12,838. Specification of Reissued Letters Patent. Reissued Aug. 4, 1908.

Original No. 880,802, dated March 3, 1908, Serial No. 336,824. Application for reissue filed April 30, 1908. Serial No. 430,241.

*To all whom it may concern:*

Be it known that I, AUGUSTE JEAN LECOUTRE, a citizen of the United States, residing at Worcester, in the county of Worcester and State of Massachusetts, have invented certain new and useful Improvements in Corsets, of which the following is a specification.

My invention relates to improvements in corsets, and particularly to that class of corsets termed abdominal corsets, which are provided with means for adjusting the corset while on the wearer, to flatten and reduce the abdomen.

The object of my invention is to provide a corset for women of stout figure, with full hips and large abdomen, which is complete in itself, but has supplemental parts, comprising two pairs of wide flaps or bands, attached to the corset at the lower front portion thereof, and extending in a substantially horizontal plane, and in a plane substantially parallel to the lower edge of the corset. One of each pair of flaps is attached to the front or busk section, and the other to the hip or side section; and one flap of each pair has a buckle attached thereto, and the other is provided with a tongue or reduced portion to engage the buckle. After the corset is in place on the wearer and the tongue or reduced end of one of the flaps of each pair is inserted through the buckle of the other flap of the pair, the wearer with each hand grasps the tongue or reduced end of one flap of each pair and draws it through the buckle, to flatten and reduce the abdomen.

In my improved construction of the adjusting means for flattening and reducing the abdomen, and the manner of attaching the same to the corset, I reduce and flatten the abdomen by drawing backwards the flaps or bands on the front or abdominal sections of the corset, without drawing in or changing the shape of the hips which will retain their ordinary fullness without regard to the strain on the front or abdominal sections of the corset, and at the same time I do not produce any folds or wrinkles in the corset at the lower front portion thereof, as is ordinarily the case in abdominal corsets provided with adjusting means, but I leave the corset perfectly even and smooth over the abdomen and the hips.

My invention consists in certain novel features of construction of my improvements, as will be hereinafter fully described.

Figure 1:
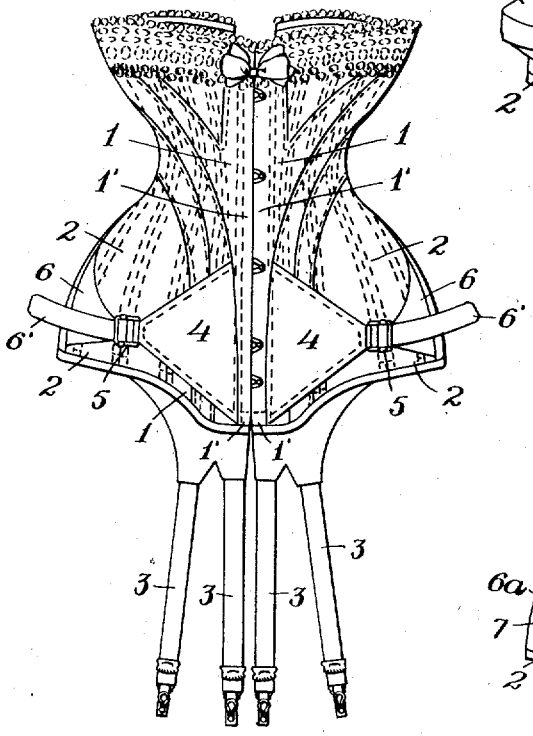
Figure 2:
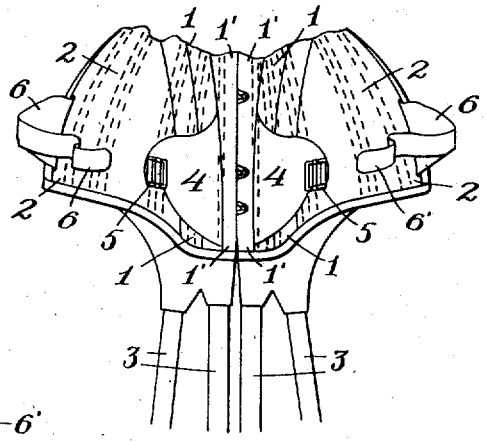
Figure 3:
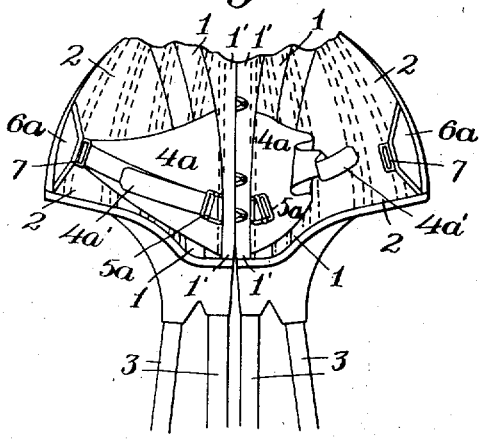

Referring to the drawings:—Figure 1 is a front view of a complete corset embodying my improvements, showing the adjusting flaps or bands connected. Fig. 2 shows a detached portion of the corset shown in Fig. 1, with the adjusting flaps or bands disconnected. Fig. 3 corresponds to Fig. 2, but shows a modified construction of the adjusting flaps or bands.

In the accompanying drawings, the corset shown has the front sections 1, and the hip sections 2. The front sections 1 are provided with the busks or front steels 1′, in the usual way. 3 are the hose supporter straps of the usual construction, and attached to the lower front edge of the corset, in the usual way. All of the above mentioned parts may be of any ordinary construction.

I will now describe my improvements shown in Figs. 1 and 2. To each front section 1, at the lower part thereof, and along the inner edge of the busks or front steels 1′, is attached a flap or band 4, preferably of substantially wedge or triangular shape, and extending to a point on the corset substantially intermediate the front section 1 and the side or hip section 2. Each flap 4 is preferably provided at its free end with a buckle 5, which may be of any ordinary construction, but is preferably constructed to bind and hold the strap passing through it, when it is drawn in one direction, and the buckle is in one position, and to release it when the buckle is moved into an opposite position, in the usual way. A second flap or band 6 is attached to the lower part of the side or hip section, and is also preferably of substantially wedge or triangular shape, with a free end or tongue 6′ of reduced width, which is adapted to be inserted through and engage with the buckle 5, so as to extend rearwardly at each side of the corset, as shown in Fig. 1.

It will be observed that the substantially triangular straps or bands 4 have their wide front ends attached to the bust sections of corset, and that the substantially triangular straps or bands 6 have their wide rear ends attached to the hip sections of the corset, so that these wide points of attachment make strong connection of the straps or bands with the corset, so as to distribute the strain on the straps or bands over considerable spaces at their points of attachment; and these wide straps or bands also serve to distribute the compressing strain exerted on the abdominal and hip portions of the body of the wearer over considerable areas at the points where it is most desirable to apply compressing pressure.

Each pair of straps or bands 4 and 6 may be connected or buckled together, before or after the corset is put on by the wearer. After the corset is put on and clasped or fastened in place, the wearer, to reduce and flatten the abdomen, draws backwards each of the ends or tongues 6′ through the attaching buckles 5, towards the rear part of the corset. This acts to draw back the rear ends of the two front flaps or bands 4, and to put a strain on the lower or abdominal part of the two front sections 1 of the corset, to draw them inwardly and backwardly toward the side or hip portions of the corset, and thus reduce and flatten the abdomen, without changing the shape of the hip portion of the corset, or reducing the hips of the wearer. Each pair of straps or bands 4 and 6 are so made and attached to the corset that the line of draft or strain on said straps or bands in adjusting the corset is in a substantially horizontal plane, and in a plane substantially parallel to the lower edge of the corset; the consequent result is, that the abdomen is reduced or flattened without raising it up, which is not the case where the line of draft or strain on the adjusting straps or bands is in an inclined or diagonal plane, as heretofore.

In Fig. 3 is shown a modified construction of my improvements. In said Fig. 3, each front flap or band $4^a$ is made somewhat larger than the front flaps or bands 4, and has its free end of reduced width, to form a tongue $4^{a\prime}$, to pass through the loop 7 on the rear flap or band $6^a$, which is preferably made somewhat smaller than the flaps or bands 6. At the front of the corset, near the lower portion thereof, and near the inner edge of the busk or steel 1′, is attached a buckle $5^a$, the buckle part of which extends at an angle, and in a plane parallel to the plane of the loop 7, when the end $4^{a\prime}$ is passed through the loop 7 and attached to the buckle $5^a$, as shown at the left in Fig. 3.

By means of the loop 7 on the flap or band $6^a$, and the buckle $5^a$, and the end $4^{a\prime}$ passing through said loop and buckle, I obtain a greater leverage for drawing back the front flaps or bands $4^a$, by drawing on the ends $4^{a\prime}$ thereof.

The advantages of my improvements will be readily appreciated by those skilled in the art. The adjustable parts are adjusted in a substantially horizontal plane, and in a plane substantially parallel to the lower edge of the corset, and the adjustment of the abdominal sections to reduce and flatten the abdomen, is readily made by the wearer after the corset is in place and secured on the wearer, by simply drawing backwards the ends of the flaps or bands which pass through the buckles.

It will be understood that the details of construction of my improvements may be varied if desired, and they may be applied to and used in connection with any ordinary style of corset.

Having thus described my invention, what I claim as new and desire to secure by Letters Patent is:—

1. The combination with a corset, of two pairs of adjusting bands or straps at the lower front part of the corset, and extending over the front and side sections, the front strap or band of each pair being of substantially triangular shape with its wide front end secured to a busk section, and the rear strap or band of each pair being also of substantially triangular shape with its wide rear end secured to the side or hip section, and a strap and buckle connection for adjustably attaching the two parts of each pair of adjusting straps or bands together, and each pair of straps or bands being so located on the corset that the draft or strain on the same, in adjusting the corset, is in a substantially horizontal plane, and in a plane substantially parallel to the lower edge of the corset.

2. The combination with a corset, of two pairs of adjusting bands or straps at the lower front portion of the corset, the front strap or band of each pair being of substantially triangular shape and having its wide front portion attached to a busk section and provided with a loop or buckle, and the rear strap or band of each pair being also of substantially triangular shape with its wide rear end attached to a hip section, and having a reduced end to pass through said loop or buckle, and each pair of straps or bands being so located on the corset that the draft or strain on the same, in adjusting the corset, will be in a substantially horizontal plane, and in a plane substantially parallel to the lower edge of the corset.

AUGUSTE JEAN LECOUTRE.

Witnesses:

JOHN C. DEWEY,
MINNA HAAS.